US007783882B2

(12) United States Patent
Dawson et al.

(10) Patent No.: US 7,783,882 B2
(45) Date of Patent: Aug. 24, 2010

(54) RECOVERING REMNANT ENCRYPTED DATA ON A REMOVABLE STORAGE MEDIA

(75) Inventors: Erika Marianna Dawson, Tucson, AZ (US); Paul Merrill Greco, Tucson, AZ (US); Glen Alan Jaquette, Tucson, AZ (US); James Mitchell Karp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 11/530,021

(22) Filed: Sep. 7, 2006

(65) Prior Publication Data

US 2008/0065881 A1    Mar. 13, 2008

(51) Int. Cl.
*H04L 29/06* (2006.01)
(52) U.S. Cl. .................. 713/165; 713/193; 707/9
(58) Field of Classification Search .......... None
See application file for complete search history.

(56) References Cited

U.S. PATENT DOCUMENTS

| | | | |
|---|---|---|---|
| 6,023,643 | A | 2/2000 | Jesionowski |
| 6,295,361 | B1 | 9/2001 | Kadansky et al. |
| 6,567,914 | B1 | 5/2003 | Just et al. |
| 6,915,434 | B1 | 7/2005 | Kuroda et al. |
| 6,918,040 | B2 | 7/2005 | Ries et al. |
| 6,950,522 | B1 | 9/2005 | Mitchell et al. |
| 7,013,389 | B1 | 3/2006 | Srivastava et al. |
| 2002/0164035 | A1 | 11/2002 | Yokota et al. |
| 2003/0043492 | A1* | 3/2003 | Chan et al. ............. 360/74.1 |
| 2003/0081787 | A1 | 5/2003 | Kallahalla et al. |
| 2003/0099362 | A1 | 5/2003 | Rollins |
| 2004/0098546 | A1* | 5/2004 | Bashant et al. ........... 711/156 |
| 2004/0243814 | A1* | 12/2004 | Nakano et al. ........... 713/189 |
| 2005/0044170 | A1* | 2/2005 | Cox et al. ............... 709/217 |
| 2005/0065971 | A1* | 3/2005 | Honda ................... 707/102 |

(Continued)

FOREIGN PATENT DOCUMENTS

CN    1759559    4/2006

(Continued)

OTHER PUBLICATIONS

U.S. Patent Application entitled "Selective Encryption of Data Stored on Removable Media in an Automated Data Storage Library", U.S. Appl. No. 11/470,670, filed Sep. 7, 2006, by inventors B. G. Goodman, J.A. Fisher, and L.G. Jesionowski.

(Continued)

*Primary Examiner*—Gilberto Barron, Jr.
*Assistant Examiner*—David Le
(74) *Attorney, Agent, or Firm*—David W. Victor; Konrad Raynes & Victor LLP (57) ABSTRACT

Provided are a method, system, and article of manufacture recovering remnant encrypted data on a removable storage media. An end of data (EOD) marker is detected on a removable storage media, wherein a first encryption key is associated with data preceding the EOD marker. Following the EOD marker, an identifier of a second encryption key associated with data following the EOD marker is read in response to detecting the EOD marker. The identifier is used to access the second encryption key and the second encryption key is used to decrypt the data following the EOD marker.

25 Claims, 6 Drawing Sheets

U.S. PATENT DOCUMENTS

| | | |
|---|---|---|
| 2005/0071591 A1 | 3/2005 | Goodman et al. |
| 2005/0086471 A1 | 4/2005 | Spencer |
| 2005/0204161 A1 | 9/2005 | Caronni |
| 2005/0207570 A1 | 9/2005 | Yamamoto et al. |
| 2005/0226423 A1 | 10/2005 | Li et al. |
| 2006/0062383 A1 | 3/2006 | Kaneda et al. |

FOREIGN PATENT DOCUMENTS

| | | |
|---|---|---|
| EP | 1624608 | 2/2006 |

OTHER PUBLICATIONS

Advanced Encryption Standard (AES), Federal Information Processing Standards Publication 197, Nov. 26, 2001, pp. 1-51.

"IBM TotalStorage Enterprise Tape System 3592—SCSI Reference" IBM Corporation, Document No. GA32-0466-02, Oct. 2005.

D.A. McGrew, et al., "The Galois/Counter Mode of Operation (GCM)", May 31, 2005, pp. 1-44.

"IEEE P1619.1/D8 Draft Standard Architecture for Encrypted Variable Block Storage Media", IEEE, 2006, pp. 1-26.

U.S. Patent Application entitled "Configuring a Storage Drive to Communicate With Encryption and Key Managers", U.S. Appl. No. 11/530,022, filed Sep. 7, 2006, by inventors B.G. Goodman, G.A. Jaquette, L.G. Jesionowski and P.M. Greco.

U.S. Patent Application entitled "Keyless Copy of Encrypted Data", U.S. Appl. No. 11/530,008 filed Sep. 7, 2006, by inventors P.M. Greco and G.A. Jaquette.

U.S. Patent Application entitled "Key Generation and Retrieval Using Key Servers", U.S. Appl. No. 11/530,006 filed Sep. 7, 2006, by inventors P.M. Greco, .TJ. Hahn and G.A. Jaquette.

U.S. Patent Application entitled "Maintaining Encryption Key Integrity", U.S. Appl. No. 11/530,012 filed Sep. 7, 2006, by inventors P.M. Greco, M.J. Sandberg and S.J. Schaffer.

U.S. Patent Application entitled "Encryption Policy Based on Data Context Recognition", U.S. Appl. No. 11/530,011 filed Sep. 7, 2006, by inventors P.M. Greco, G.A. Jaquette, and W.E. Rhoten.

U.S. Patent Application entitled "Detection and Handling of Encryption Key and Initialization Vector", U.S. Appl. No. 11/530,010 filed Sep. 7, 2006, by inventors P.M. Greco, M.J. Sandberg and S.J. Schaffer.

U.S. Patent Application entitled "Verification of Encryption Key", U.S. Appl. No. 11/530,009 filed Sep. 7, 2006, by inventors P.M. Greco, S. Halevi and G.A. Jaquette.

U.S. Patent Application entitled "Automatically Filling a Drive Table", U.S. Appl. No. 11/530,013 filed Sep. 7, 2006, by inventors T.J. Hahn and G.A. Jaquette.

U.S. Patent Application entitled "Validating an Encryption Key File on Removable Storage Media", U.S. Appl. No. 11/530,019 filed Sep. 7, 2006, by inventors H. Itagaki, J.M. Karp, H. Nakayama, T. Shiratori and P.M. Greco.

U.S. Patent Application entitled "Data Library Background Operations System Apparatus and Method", U.S. Appl. No. 11/470,964 filed Sep. 7, 2006, by inventors B.G. Goodman and L.G. Jesionowski.

U.S. Patent Application entitled "Secure Transmission of Cryptographic Key", U.S. Appl. No. 11/530,014 filed Sep. 7, 2006, by inventors P.M. Greco, M.J. Sandberg, and S.J. Schaffer.

U.S. Patent Application entitled "Rekeying Encryption for Removable Storage Media", U.S. Appl. No. 11/470,994, filed Sep. 7, 2006, by inventors J.A. Fisher, B.G. Goodman, G.A. Jaquette, and L.G. Jesionowski.

U.S. Patent Application entitled "Apparatus, System, and Method for Self-Describing Heterogeneous Magnetic Tape Formatting", U.S. Appl. No. 11/679,736, filed Feb. 27, 2007, by inventors, G.A. Jaquette, S.J. Schaffer and T. Shiratori.

U.S. Patent Application entitled "System and Method for Processing User Data in an Encryption Pipeline", U.S. Appl. No. 11/688,445, filed Mar. 20, 2007, by inventors P.M. Greco, S. Halevi, and G.A. Jaquette.

U.S. Patent Application entitled "Method, System and Apparatus for Dynamically Validating a Data Encryption Operation", U.S. Appl. No. 11/285,408, filed Nov. 22, 2005, by inventors P.M. Greco, M.J. Sandberg, and S.J. Schaffer.

U.S. Patent Application entitled "Use of Indirect Data Keys for Encrypted Tape Cartridges", U.S. Appl. No. 11/742,819, filed May 1, 2007, by inventors P.M. Greco, S. Halevi, and G.A. Jaquette.

Delphion Integrated View: INPADOC Record for CN1759559A: Copyright Protection System, Recording Apparatus, Reproduction Application and Recording Medium, published Apr. 12, 2006.

* cited by examiner

RECOVERING REMNANT ENCRYPTED DATA ON A REMOVABLE STORAGE MEDIA

BACKGROUND OF THE INVENTION

1. Field of the Invention

The present invention relates to a method, system, and article of manufacture for recovering remnant encrypted data on a removable storage media.

2. Description of the Related Art

Data stored on removable tape cartridges may be logically erased, but the data on the tape may remain. A tape cartridge that is logically erased may be placed in a pool of cartridges available for reuse, to store new data. New data written to a tape, which includes remnant blocks of data that were previously logically erased, has an End of Data (EoD) marker following the last block which was newly written to the tape. New data written to the tape would begin to overwrite the logically erased, has an end of data (EOD) marker following the last block written to the tape. Data written to the tape would overwrite the logically erased data remaining on the tape.

A user may want to recover data on a tape that is logically erased, but remains on the tape following the newly written EOD marker. Utilities exist to scan past the EOD marker to start reading the old data that remains on the tape to allow automatic recovery of the logically erased data that remains on the tape past the EOD marker of the currently written active data.

There is a need in the art for improved techniques for reading remnant data on a tape cartridge or other removable storage media, especially for remnant encrypted data.

SUMMARY

Provided are a method, system, and article of manufacture recovering remnant encrypted data on a removable storage media. An end of data (EOD) marker is detected on a removable storage media, wherein a first encryption key is associated with data preceding the EOD marker. Following the EOD marker, an identifier of a second encryption key associated with data following the EOD marker is read in response to detecting the EOD marker. The identifier is used to access the second encryption key and the second encryption key is used to decrypt the data following the EOD marker.

DETAILED DESCRIPTION

Figure 1:
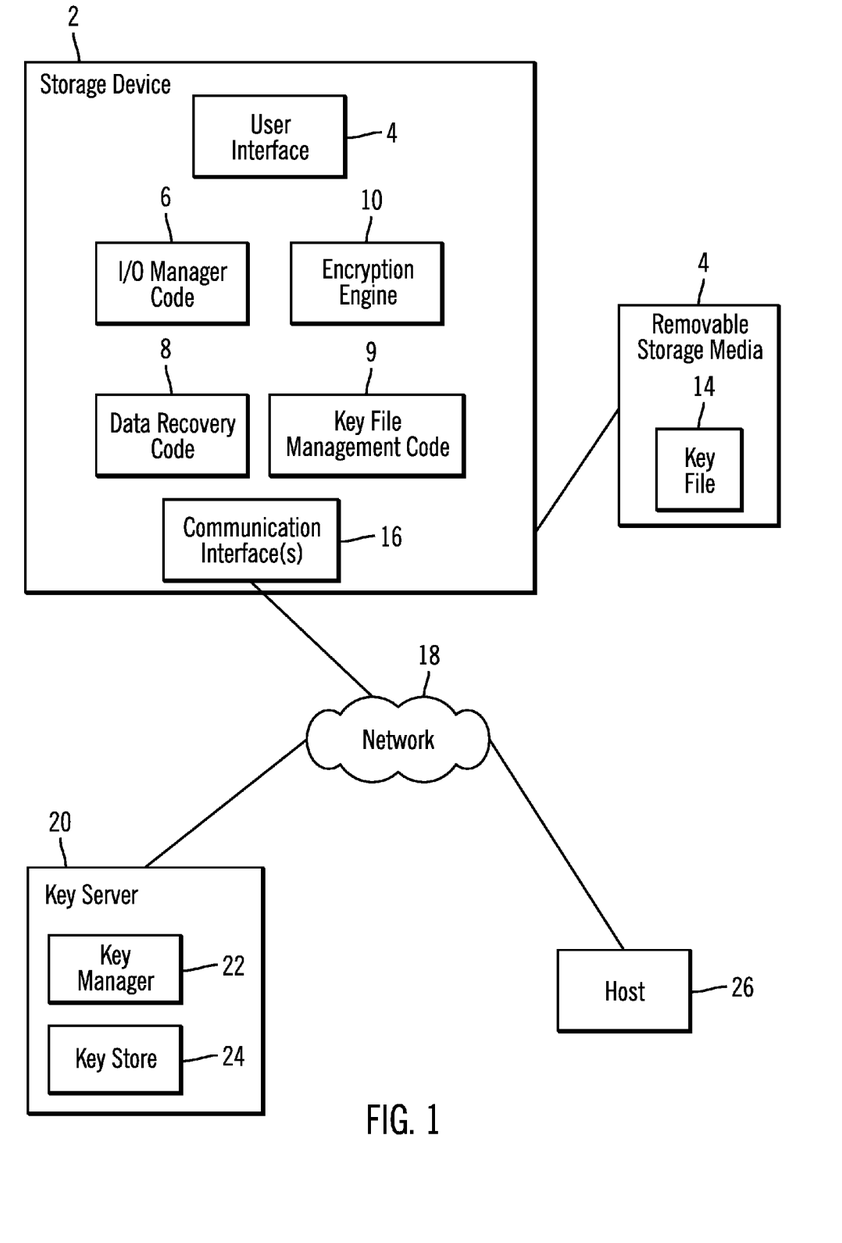
FIG. 1 illustrates an embodiment of a computing environment including a storage drive.

FIG. 1 illustrates an embodiment of a storage drive 2, which may comprise a removable storage drive, for interfacing with a removable storage media 4. The storage drive 2 may include a user interface 6 comprising one or more buttons or keys for interacting with the storage drive 2. The user interface 4 may include an eject button for manually unloading removable media; up/down buttons for navigating a list of items, enter/exit buttons for selecting items or exiting from a menu or list; one or more status displays, such as a light or LED (Light Emitting Diode), a numeric display, and alphanumeric display, etc. Additionally, a user interface may be presented to the storage device 2 on a connected computer system.

The storage drive 2 includes Input/Output (I/O) manager code 6 to perform read/write operations with respect to the coupled removable storage media 4, data recovery code 8, key file management code 9, an encryption engine 10, and a non-volatile memory 12, such as a Flash Memory, Electronically Erasable Programmable Read Only Memory (EEPROM), battery backed up Random Access Memory (RAM), etc. The removable storage media 4 may comprise any type of media on which data may be stored and which may serve as removable media, including but not limited to magnetic media (such as magnetic tape or disks), optical media (such as optical tape or disks), electronic media (such as PROM, EEPROM, flash PROM, MRAM, CompactFlash™, Smartmedia™, Memory Stick™, etc.), or other suitable media. In certain embodiments, the removable storage media has a cartridge housing, such as the case with a magnetic tape cartridge or removable disk drive.

The removable storage media 4 further stores one or more copies of a key file 14 that may store indexable active and previously used encryption data keys used by the encryption engine 10 during multiple previous write passes on the removable storage media 4 storing the key file 14. The keys in the key file 14 may comprise encrypted encryption keys, which were encrypted using a key encryption key (KEK) known and maintained by the remote key manager 22. Alternatively, the key file 14 may include identifiers of previously used encryption keys, where the storage drive 2 communicates a key identifier to the key manager 22 to obtain the encryption key to use to decrypt/encrypt data in the coupled removable storage media 4. In certain embodiments, the key file 14 may comprise a first-in-first-out list (FIFO) of used keys. The key file management code 9 performs operations with respect to the key file 14, such as reading the key file 14 from the coupled removable storage media 4 and managing access to the key file 14.

The encryption engine 10 may use one or more encryption algorithms to encrypt and decrypt data with respect to the coupled removable storage media 4, which include, but are not limited to, DES (Data Encryption Standard), AES (Advanced Encryption Standard), RSA (Rivest Shamir Adleman), and other suitable encryption algorithms known in the art.

The storage drive 2 includes one or more communication interfaces 16 to enable communication with different external devices, such as computer systems, a storage library, etc. There may be multiple interfaces for connecting to different devices or host computers. In addition, there may be redundant interfaces to improve reliability, availability, connectivity, or performance. In one embodiment, the interfaces 16 may comprise different interfaces and different communication protocols. The one or more communication interfaces 16 may comprise serial, parallel, or optical interfaces such as RS-232, USB (Universal Serial Bus), serial or parallel ATA (AT Attachment), SCSI (Small Computers System Interface), SAS (Serial Attached SCSI), Fibre Channel, IEEE 1394 (FireWire or iLink), IEEE 1284 (parallel port), etc. In addition, interface 10a and/or 10b may comprise network or wireless interfaces such as Ethernet, CAN (Controller Area Network), 802.11 (Wi-Fi), X.25 (WAN), Bluetooth, etc. The communication interface(s) 16 may be used to provide commands and/or data to the storage drive 2.

In the embodiment of FIG. 1, communication interface 16 enables communication with a network 18 through which the storage drive 2 may communicate with a key server 20 including a key manager 22 and a key store 24 and additional systems, such as host system 26. The key server 20 may be remote with respect to the storage drive 2. The host system may include a computer user interface to enable communication of data and commands to the storage drive 2. The host system 26 may further include a backup program, archival software or any other host application that is capable of sending read/write requests to the storage drive 2 for a coupled removable storage media. In an alternative embodiment, the communication interface(s) 16 may comprise a direct line connection to the system 20 and/or host system 26.

The key server 20 receives requests for keys from the storage drive 2 and other components for keys the key manager 22 maintains in a key store 24, where the key store 24 comprises a database or other data structure storing keys (the KEK and/or encryption keys) that are used to encrypt data from different removable media 4. The key store 24 may comprise a software element such as an array, structure, database, file, etc. In addition, a key store may also comprise a hardware element such as memory, media, a hard drive, storage device, etc.

The key manager 22 may receive an encrypted encryption key and a request for the encryption key from the storage drive 2, and then access the KEK from the key storage 24 to use to decrypt the encrypted encryption key and then send the decrypted encryption key to the storage drive 2 or other authorized component requesting the unencrypted encryption key. The encryption engine 10 uses the received unencrypted encryption key to use to decrypt/encrypt data, and then discard the unencrypted data key after using the data key for a session or operation. In such case, the key file 14 may maintain the active and previously used encrypted encryption keys or encryption key identifiers, so that the storage drive 2 has to communicate with the remote key manager 22 to obtain an unencrypted encryption key that may be used by the encryption engine 10.

Further, when the storage drive 2 needs a new key to use to encrypt/decrypt data to the coupled removable storage media 4, the storage drive 2 requests a new key from the key serer 20. The key manager 22 may generate a new encryption key and a KEK, which are maintained in the key storage 24. The key manager 22 uses the KEK to encrypt the new encryption key and then sends the unencrypted encryption key to the storage drive 2 to use and sends the encrypted encryption key for storage in the key file 14.

Figure 2:
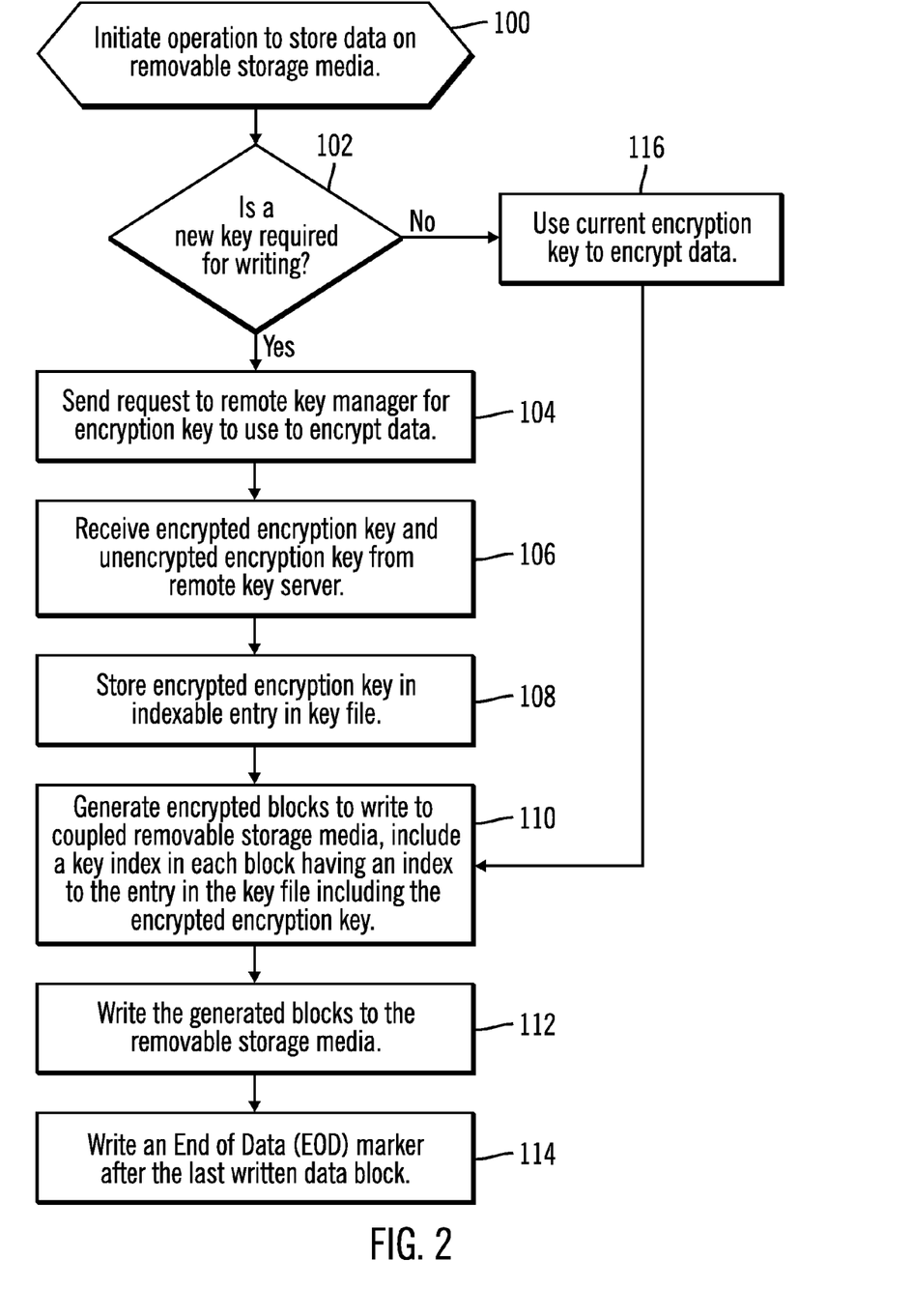
FIG. 2 illustrates an embodiment of operations to write encrypted blocks of data to a removable storage media.

FIG. 2 illustrates an embodiment of operations performed by components of the storage drive 2, such as the I/O manager code 6, the key file management code 9, and the encryption engine 10 to write blocks of data to a coupled removable storage media 4 using an encryption key. Upon initiating (at block 100) an operation to write data blocks to the coupled removable storage media 4, the I/O manager 6 or other component, such as the encryption engine 10, determines (at block 102) whether a new encryption key is needed, i.e., the current key expired or the I/O manager 6 is writing from the beginning of the tape or beginning of a partition. In embodiments where the removable storage medium 4 comprises magnetic tape, the I/O manager 6 may write blocks of data in a serpentine pattern across the length of the tape. If (at block 102) a new encryption key is required, then the I/O manager 6 sends (at block 104) a request to the remote key manager 22 for a data key to use to encrypt data. Upon receiving (at block 106) the encrypted data key, i.e., encrypted with a KEK, and the unencrypted data key from the remote key manager 22, the key file management code 9 stores (at block 108) the encrypted data key in an indexable entry in the key file 14. The I/O manager 6 generates (at block 110) blocks of data to write to the coupled removable storage media 4 and the encryption engine 10 writes (at block 112) the blocks to the coupled removable storage media 4, encrypted using the new encryption key. The I/O manager 6 further writes (at block 114) an End of Data (EOD) marker after the last written data block.

Figure 3:
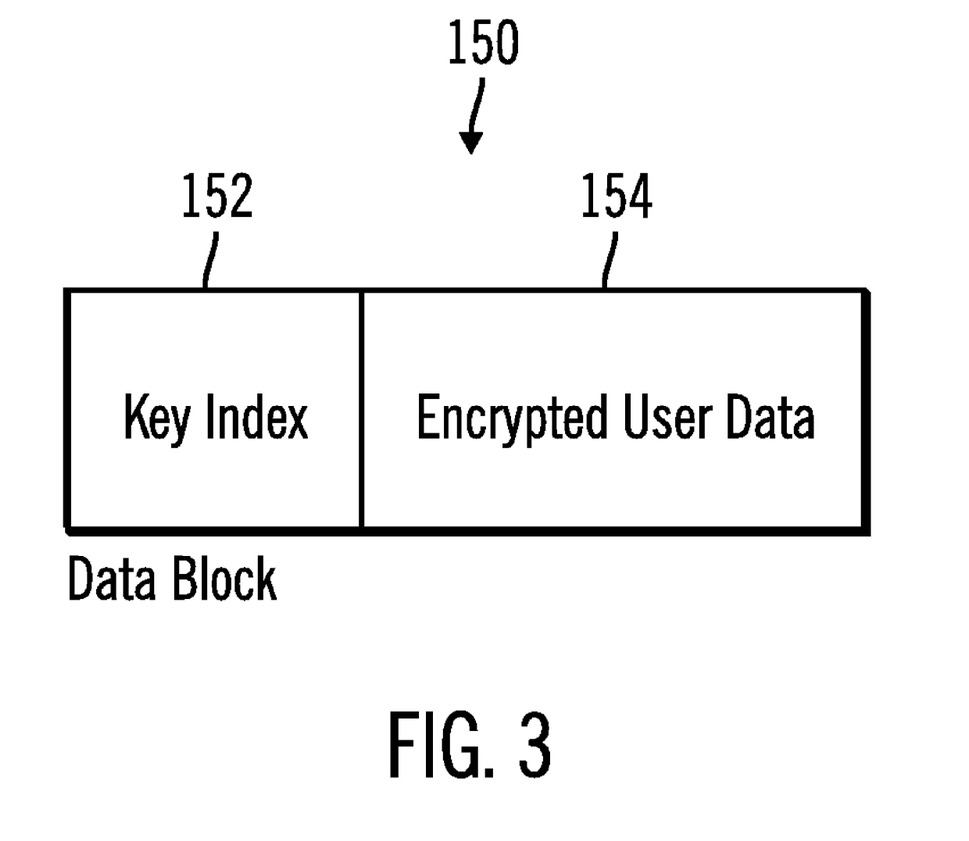
FIG. 3 illustrates an embodiment of a format of a data block.

FIG. 3 illustrates an embodiment of a generated data block 150 having an unencrypted key index 152 and the encrypted data 154. The key index 152 in each block 150 may include an index to the entry in the key file 14 including the (encrypted) encryption key used to encrypt the user data in the data block 150. The key index 152 in the block 150 may not be encrypted. The key index 152 in the block may comprise a hash of the encrypted encryption key itself, where the hash value identifies the entry in the key file 14 having the encrypted key. In an alternative embodiment, the key index 152 in the block 150 may include an alternative type of identifier to the encrypted encryption key in the key file 14.

If (at block 102) a new encryption key was not needed, then the encryption engine 10 uses (at block 116) the current available data key to encrypt the data and proceeds to block 110 to generate and write the blocks with encrypted data. If the storage drive 2 has the encrypted version of the encryption key, then the I/O manager may send the encrypted encryption key to the remote key server 20 to decrypt and return to the storage drive 2 to use for encryption and writing.

With the described operations of FIG. 2, a key file 14 is maintained of previously used encryption keys. If the I/O manager 6 overwrites a removable storage media 4 having previously written encrypted data, then the data blocks following the EOD marker have a key index 152 identifying the encryption key used to encrypt the data following an EOD marker.

Figure 4:
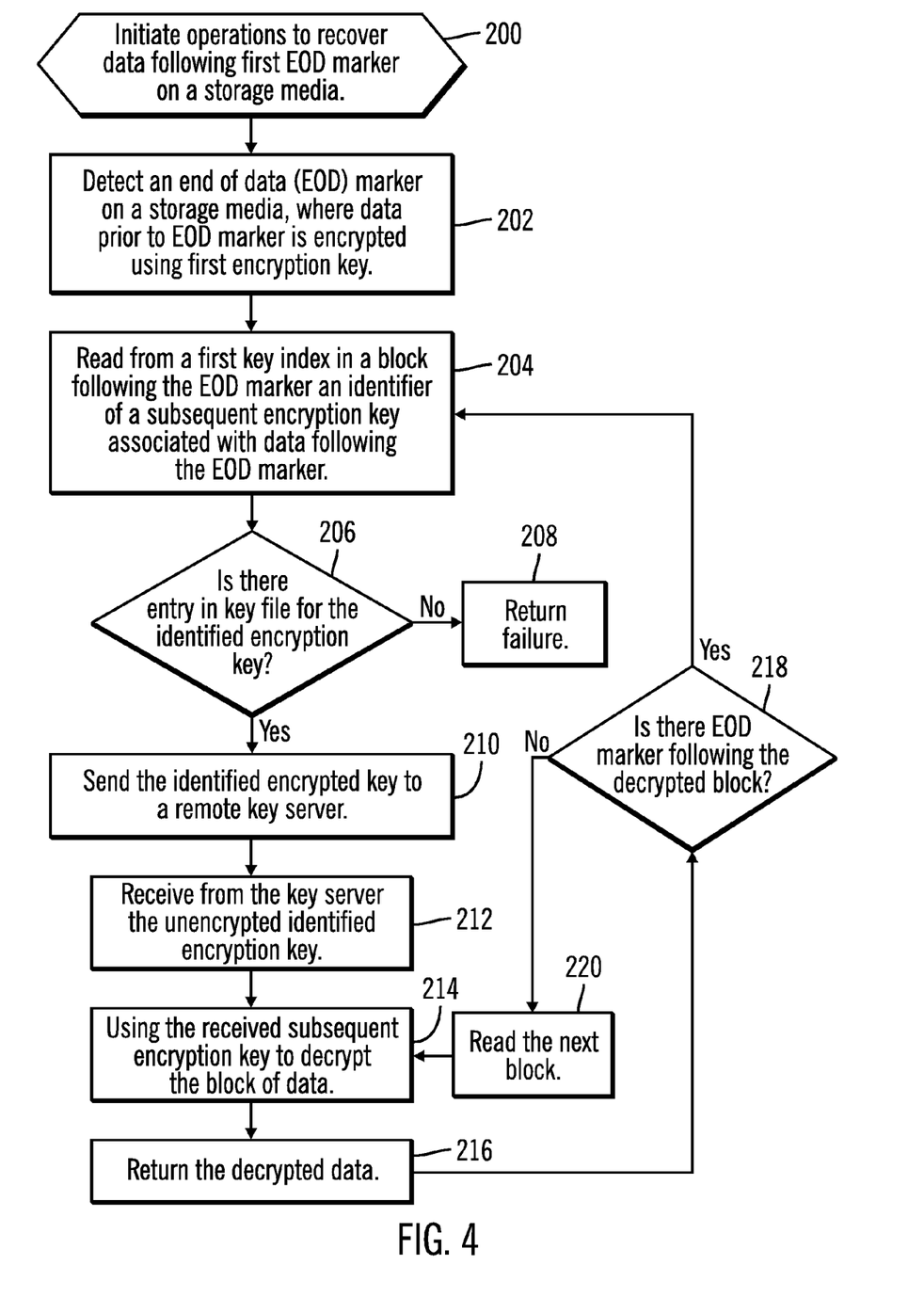
FIG. 4 illustrates an embodiment of operations to recover encrypted data from a removable storage media.

FIG. 4 illustrates an embodiment of operations performed by the data recovery code 8 and other components, such as the key file management code 9 and encryption engine 10, to recover remnant data written past an EOD marker and encrypted using an expired or previously used key. As discussed, the remnant data past an EOD marker may comprise data logically erased, but that was not physically erased from the storage media 4. In one embodiment, the data recovery code 8 may be included in the storage driver 2 that may be invoked to recover data past the EOD marker. In an alternative embodiment, the data recovery code 8 may reside on a host 26 or other external device and be invoked to communicate with the storage drive 2 to recover data past the EOD marker encrypted with an expired key. Upon initiating (at block 200) operations to recover data following a first EOD marker on a coupled removable storage media 4, the data recovery code 8 scans the storage media blocks and detects (at block 202) an end of data (EOD) marker on the coupled storage media 4, where data prior to the EOD marker was encrypted using a first encryption key, which may comprise the current encryption key being used by the I/O manager 6. The data recovery code 8 reads (at block 204) from a first key index 152 in a block 150 following the EOD marker an identifier of an encryption key associated with data written following the EOD marker. As discussed, this index 152 may identify/index an encrypted encryption key in the key file 14.

If (at block 206) there is no entry in the key file 14 for the identified subsequent encryption key, identified in the read key index 152, then failure is returned (at block 208) indicating data after the EOD marker cannot be recovered. If the identified key is in the key file 14, then the data recovery code 8 accesses the identified key from the list 14 and sends (at block 210) the encrypted subsequent encryption key to the remote key server 20, which decrypts the key with an associated KEK in the key storage 24. Upon receiving (at block 212) from the remote key server 20 the unencrypted encryption key, the encryption engine 10 uses (at block 214) the received unencrypted encryption key to decrypt the block of data following the located EOD marker. The decrypted remnant bock of data following the EOD marker is returned (at block 216).

After decrypting a remnant block, the data recovery code 8 determines (at block 218) whether there is an EOD marker following the decrypted block. If not, then the data recovery code 8 reads (at block 220) the next block and proceeds to block 214 where the encryption engine 10 uses the previously obtained unencrypted encryption key to decrypt the next block of data. If another EOD marker is detected (at block 218), then control proceeds to block 204 to try to obtain the previously used encryption key to recover the encrypted data following this further EOD marker.

With the described embodiments, when reading past newly written data, the storage drive can obtain the encryption key to decrypt encountered "old" encrypted data. If the key necessary to read that "old" encrypted data was retained, then the old encrypted data is readable; if it was not, then the old encrypted data is not readable. The key for the "old" encrypted data may have been retained on the storage cartridge or it may have been stored remotely from the cartridge (e.g. in an application's data base or in a key server). The latter situation may occur if the key was directly served to the storage drive and not stored to cartridge. In either case, the storage drive attempts to locate a Key ID from the storage media. If the storage drive can locate the key associated with that KeyID written to the storage media, then the storage drive can read the old encrypted data. If the storage drive cannot locate that key (e.g. because all copies of it have been erased), then the old encrypted data is not decryptable, and thus is not accessible in decrypted form.

Figure 5:
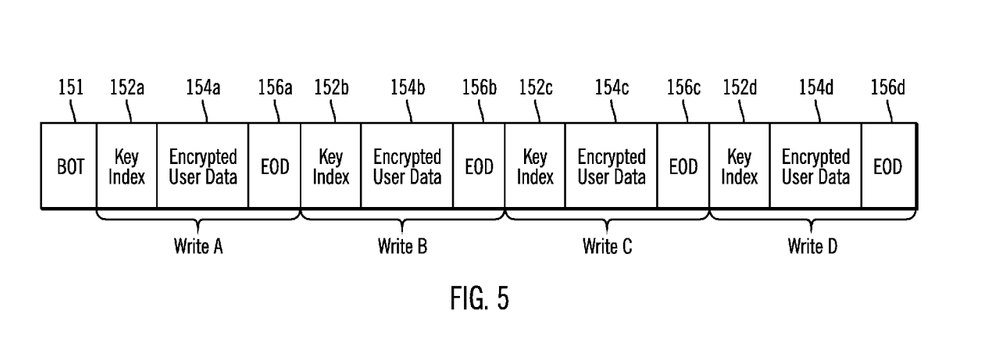
FIG. 5 illustrates an example of remnant data written to a storage media.

FIG. 5 provides an example of the residue of four writes, referred to as Write A, Write B, Write C and Write D on storage media, where each write is written at different times using different encryption keys. Each write A, B, C, D includes a key index 152*a*, 152*b*, 152*c*, and 152*d* and an encrypted user data section 154*a*, 154*b*, 154*c*, 154*d*, such as described in FIG. 3, and an end of data (EOD) marker 156*a*, 156*b*, 156*c*, 156*d*. In the example of FIG. 5, write A is the oldest and longest, write B is the next oldest and shorter than write A, write C is the next oldest and shorter than write B, and write D is the youngest and the shortest. A beginning of tape (BOT) 151 comprises the beginning of the location on the storage media, e.g., tape, to which data is written. Further, any number of other writes could have occurred between writes A and B, or between writes B and C, or between writes C and D, for which their is no residual encrypted data as a result of overwriting. With the described embodiments, the storage drive can read encrypted data from the four different write sessions. Presumably, the storage drive should be able to fully decrypt write D because it is current and may be able to read all that is left of C if the encryption key for write C can be located on the cartridge or somewhere else. The storage drive cannot read any of write B if its keys were intentionally shredded or erased. However, the storage drive could still read all that is left of write D because those keys were retained even when write C's keys were shredded.

Figure 6:
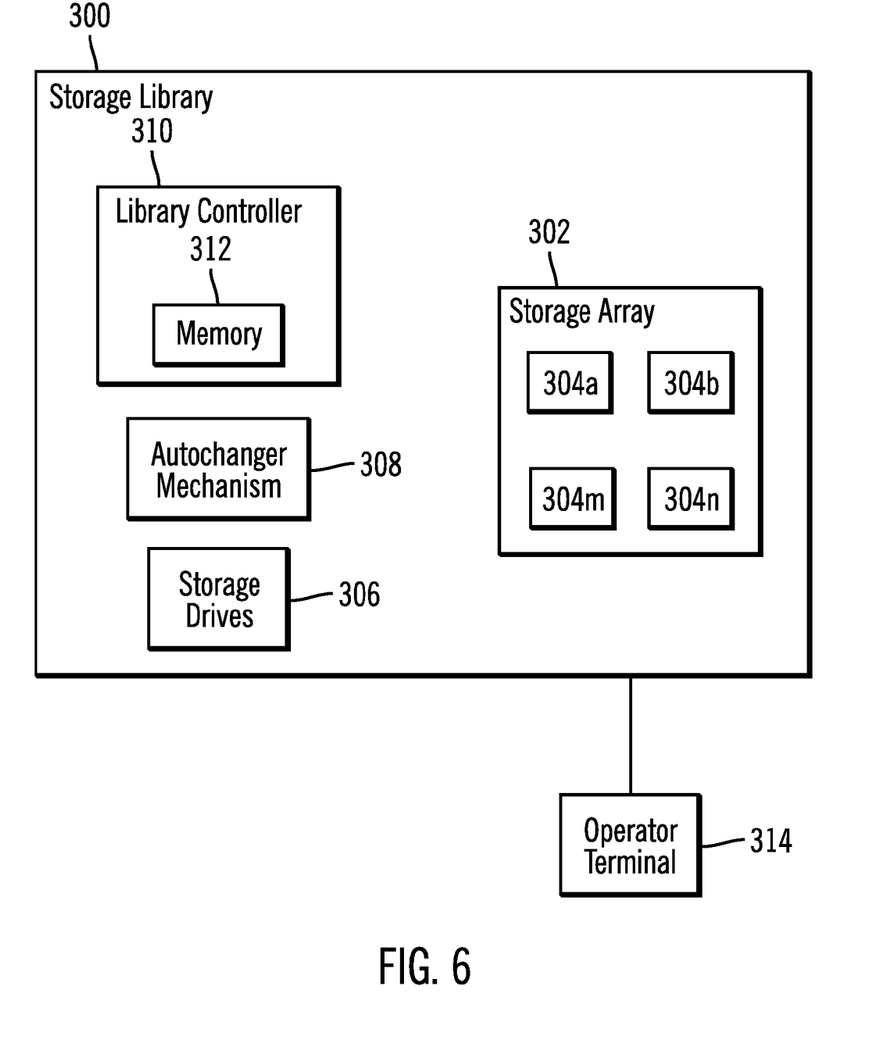
FIG. 6 illustrates an embodiment of an automated storage library.

FIG. 6 illustrates an embodiment of an automated storage library 300 including a storage array 302 of storage cells or slots in which removable storage media 304*a*, 304*b* ... 304*n* may be placed; storage drives 306, such as a tape drive, optical disk drive or other removable media, to which a removable storage media is coupled to for access; an autochanger mechanism 308 to transfer removable storage media between the storage array 302 and storage drives 306, such as a picker assembly and carriage assembly; and a library controller 310 to control the library 300 component operations. An example of a library 300 is the IBM 3584 UltraScalable Tape Library. The storage drives 306 included in the library 300 may comprise instances of the storage drive 2 of FIG. 1 and the removable storage media 304*a* ... 304*n* may comprise instances of the removable storage media 4 shown in FIG. 1.

In certain embodiments, the library controller 310 is comprised of a microprocessor and various controls and interfaces to control the operation of the components in the automated library 300, including the autochanger mechanism 308 and storage drives 304*a*, 304*b* ... 304*n*. The library controller 310 utilizes a memory 312 to store various information, such as a storage media map maintaining information on the location of removable storage media in the library 300, including the contents of the library elements in the storage array 302. The library controller 310 may comprise a single processing unit, multiple redundant processing units, and/or multiple distributed processing units.

A library operator may directly control operations and the management of removable storage media 304*a*, 304*b* ... 304*n* through an operator terminal 314 coupled to the library 300, consisting of a display device and keyboard, to interface with the library controller 310. The operator terminal 314 may comprise a computer, workstation, personal computer, palm computer, operator panel, entry keys and a display, web user interface, proprietary user interface, or any other device or interface capable of providing a user interface for the library 300. Additionally, a host system (not shown) may send commands to the library controller 308 to control the movement of media within the automated library 300. A host system (not shown) may also send commands to storage drives 306 to perform read and/or write operations on with respect to removable storage media 304*a*, 304*b* ... 304*n*. The host system(s) may communicate with the library 300 and/or the storage drives 306 over one or more networks or interfaces.

In the described embodiments, the key file 14 stores encrypted encryption keys, where the data recovery code 8 sends the encrypted encryption key to the key manager 22 for decryption. In an alternative embodiment, there may not be a key file 14, and instead the data recovery code 8 sends the encryption key identifier in the key index 152 (FIG. 3) to a key server 20 to obtain the encryption key. In a yet further embodiment, the key file 14 may maintain the unencrypted expired encryption keys that may be directly accessed and used to decrypt data.

With the described operations of FIG. 4, encrypted remnant data following an EOD marker that was encrypted with a previously used encryption key may be recovered from information on the previously used key used to encrypt the data, where the previously used key may be maintained in a key file.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where one or more processors may read and execute the code from one or more computer readable media. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, MRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In described embodiments, the key server 20 is remote to the storage drive 2. In an alternative embodiment, the key manager and key store may be implemented within code within the storage drive 2.

In the described embodiments, data recovery was performed with respect to remnant data following an EOD marker that was previously logically erased. In further embodiments, the remnant data may comprise data other than data that was logically erased that follows an EOD marker. For instance, the remnant data may comprise active data that was inadvertently overwritten.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variables "n" and "m" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 2 and 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    detecting an end of data (EOD) marker on a removable storage media, wherein a first encryption key is associated with data preceding the EOD marker;
    reading, following the EOD marker, an identifier of a second encryption key associated with data following the EOD marker in response to detecting the EOD marker;
    using the identifier to access the second encryption key; and
    using the second encryption key to decrypt the data following the EOD marker.

2. The method of claim 1, wherein using the identifier to obtain the second encryption key comprises:

maintaining in a key file stored in the removable storage media currently and previously used encryption keys to encrypt data on the removable storage media, wherein the identifier is used to access the second encryption key from the key file.

3. The method of claim 2, further comprising:
receiving selection of a disable mode; and
disabling the maintaining of the previously used encryption keys in the key file, wherein encrypted data following the EOD marker cannot be decrypted in the disable mode.

4. The method of claim 2, wherein a storage drive performs the operations of detecting the EOD marker, reading the identifier of the second encryption key, using the identifier to access the second encryption key, using the second encryption key to decrypt the data, and maintaining the key file on the removable storage media.

5. The method of claim 4, wherein the encryption keys in the key file are encrypted with at least one key encryption key (KEK), wherein the accessed second encryption key is encrypted with one KEK, further comprising:
sending, by the storage drive, the encrypted second encryption key to a key server;
receiving, by the storage drive, from the key server an unencrypted second encryption key, wherein the unencrypted second encryption key is used to decrypt the data following the EOD marker.

6. The method of claim 2, wherein a key index is included in each block of data written to the storage media, wherein the identifier of the second encryption key is read from a first key index in a block of data following the EOD marker in the storage media, and wherein the identifier comprises an index to the second encryption key in the key file.

7. The method of claim 1, wherein using the identifier of the second encryption key to access the second encryption key comprises:
sending the identifier to a key manager; and
receiving the second encryption key identified by the identifier from the key manager.

8. The method of claim 1, wherein the EOD marker comprises a first EOD marker, further comprising:
detecting a subsequent EOD marker on the storage media following the first EOD marker;
reading, following the subsequent EOD marker, an identifier of a third encryption key associated with data following the subsequent first EOD marker;
using the identifier of the third encryption key to access the third encryption key; and
using the third encryption key to decrypt the data following the subsequent EOD marker.

9. A system coupled to a removable storage media, comprising:
a storage drive implementing data recovery code operable to perform operations, the operations comprising:
detecting an end of data (EOD) marker on a removable storage media, wherein a first encryption key is associated with data preceding the EOD marker;
reading, following the EOD marker, an identifier of a second encryption key associated with data following the EOD marker in response to detecting the EOD marker; and
using the identifier to access the second encryption key; and
an encryption engine operable to use the second encryption key to decrypt the data following the EOD marker.

10. The system of claim 9, wherein using the identifier to obtain the second encryption key comprises:

maintaining in a key file stored in the removable storage media currently and previously used encryption keys to encrypt data on the removable storage media, wherein the identifier is used to access the second encryption key from the key file.

11. The system of claim 10, wherein the operations performed by the data recovery code further comprise:
receiving selection of a disable mode; and
disabling the maintaining of the previously used encryption keys in the key file, wherein encrypted data following the EOD marker cannot be decrypted in the disable mode.

12. The system of claim 10, wherein a storage drive performs the operations of detecting the EOD marker, reading the identifier of the second encryption key, using the identifier to access the second encryption key, using the second encryption key to decrypt the data, and maintaining the key file on the removable storage media.

13. The system of claim 12, wherein the encryption keys in the key file are encrypted with at least one key encryption key (KEK), wherein the accessed second encryption key is encrypted with one KEK, further comprising:
key management code enabled to perform operations comprising:
sending, by the storage drive, the encrypted second encryption key to a key server; and
receiving, by the storage drive, from the key server an unencrypted second encryption key, wherein the unencrypted second encryption key is used to decrypt the data following the EOD marker.

14. The system of claim 10, wherein a key index is included in each block of data written to the storage media, wherein the identifier of the second encryption key is read from a first key index in a block of data following the EOD marker in the storage media, and wherein the identifier comprises an index to the second encryption key in the key file.

15. The system of claim 9, wherein using the identifier of the second encryption key to access the second encryption key comprises:
sending the identifier to a key manager; and
receiving the second encryption key identified by the identifier from the key manager.

16. The system of claim 9, wherein the EOD marker comprises a first EOD marker, wherein the data recovery code is further operable to perform:
detecting a subsequent EOD marker on the storage media following the first EOD marker;
reading, following the subsequent EOD marker, an identifier of a third encryption key associated with data following the subsequent first EOD marker;
using the identifier of the third encryption key to access the third encryption key; and
wherein the encryption engine is further operable to use the third encryption key to decrypt the data following the subsequent EOD marker.

17. The system of claim 9, further comprising:
at least one storage drive, wherein the encryption engine and the data recovery code are included within each instance of the storage drive;
a storage array including a plurality of removable storage media;
an autochanger mechanism enabled to transfer removable storage media in the storage array to the at least one storage drive to couple the removable storage media to the at least one storage drive; and
a controller to control operations of the storage drive and the autochanger mechanism.

18. A computer readable medium including code to cause operations with respect to a removable storage media, the operations comprising:
- detecting an end of data (EOD) marker on the removable storage media, wherein a first encryption key is associated with data preceding the EOD marker;
- reading, following the EOD marker, an identifier of a second encryption key associated with data following the EOD marker in response to detecting the EOD marker;
- using the identifier to access the second encryption key; and
- using the second encryption key to decrypt the data following the EOD marker.

19. The computer readable medium of claim 18, wherein using the identifier to obtain the second encryption key comprises:
- maintaining in a key file stored in the removable storage media currently and previously used encryption keys to encrypt data on the removable storage media, wherein the identifier is used to access the second encryption key from the key file.

20. The computer readable medium of claim 19, further comprising:
- receiving selection of a disable mode; and
- disabling the maintaining of the previously used encryption keys in the key file, wherein encrypted data following the EOD marker cannot be decrypted in the disable mode.

21. The computer readable medium of claim 19, wherein a storage drive performs the operations of detecting the EOD marker, reading the identifier of the second encryption key, using the identifier to access the second encryption key, using the second encryption key to decrypt the data, and maintaining the key file on the removable storage media.

22. The computer readable medium of claim 21, wherein the encryption keys in the key file are encrypted with at least one key encryption key (KEK), wherein the accessed second encryption key is encrypted with one KEK, wherein the operations further comprise:
- sending, by the storage drive, the encrypted second encryption key to a key server;
- receiving, by the storage drive, from the key server an unencrypted second encryption key, wherein the unencrypted second encryption key is used to decrypt the data following the EOD marker.

23. The computer readable medium of claim 19, wherein a key index is included in each block of data written to the storage media, wherein the identifier of the second encryption key is read from a first key index following the EOD marker, and wherein the identifier comprises an index to the second encryption key in the key file.

24. The computer readable medium of claim 18, wherein using the identifier of the second encryption key to access the second encryption key comprises:
- sending the identifier to a key manager; and
- receiving the second encryption key identified by the identifier from the key manager.

25. The computer readable medium of claim 18, wherein the EOD marker comprises a first EOD marker, wherein the operations further comprise:
- detecting a subsequent EOD marker on the storage media following the first EOD marker;
- reading, following the subsequent EOD marker, an identifier of a third encryption key associated with data following the subsequent first EOD marker;
- using the identifier of the third encryption key to access the third encryption key; and
- using the third encryption key to decrypt the data following the subsequent EOD marker.

* * * * *